May 28, 1963 M. J. RELIS ETAL 3,091,738
CIRCUIT PASSING ONLY SIGNALS OF DURATIONS LONGER THAN
A PREDETERMINED VALUE DESPITE CHANGES IN SCAN SPEED
Filed May 23, 1958 5 Sheets-Sheet 1

INVENTORS.
MATTHEW J. RELIS
CARL M. MENGANI
BY Eli Weiss
ATTORNEY

United States Patent Office 3,091,738
Patented May 28, 1963

3,091,738
CIRCUIT PASSING ONLY SIGNALS OF DURA-
TIONS LONGER THAN A PREDETERMINED
VALUE DESPITE CHANGES IN SCAN SPEED
Matthew J. Relis, Bayside, and Carl M. Mengani, New
York, N.Y., assignors to Burroughs Corporation, De-
troit, Mich., a corporation of Michigan
Filed May 23, 1958, Ser. No. 737,312
17 Claims. (Cl. 328—111)

This invention relates generally to a pulse signal filter and more particularly to a device that inhibits the passage of all pulse signals having durations equal to or shorter than a predetermined value, and passes all pulse signals having durations longer than a predetermined value.

In a system in which significant pulse signals have a minimum pulse duration greater than a time $\Delta T$ it may be desirable or necessary to suppress all pulses having a duration equal to or less than $\Delta T$.

This is especially true in devices for recognizing printed characters, for example by optical means, such as where successive portions of each printed character are scanned by a photoelectric cell having a two-valued voltage output indicative of the black and white areas of the character. The device may identify characters by sampling the voltage output at selected points in the scan of the photoelectric cell. Dark flecks in the white areas and light spots in the printed dark areas will produce pulses in the output of the photoelectric cell which are shorter in duration than the pulses corresponding to the black and the white portions of the printed characters. These short pulses have no significance for the purpose of identifying the scanned characters and they may cause erroneous identifications. To insure reliable character identification it is necessary to eliminate these short pulses.

The necessity of preventing erroneous indications is also important in character recognition systems which sense the character by other means, or which measure the dimensions of the characters or which measure the thickness of the printed parts of the characters. Spurious black and white signals might otherwise prematurely initiate or terminate the measurements.

In a system in which positive-going wave forms represent an absence of light, a short positive-going pulse will signal the scan of an unwanted black spot and may be termed a "pepper" pulse. A negative going pulse of short duration will signal the scan of an unwanted white spot and may be termed a "salt" pulse. The pepper and salt pulses (hereinafter sometimes referred to as "noise") resulting from these spurious black and white spots in and near the printed character must be eliminated to prevent the occurrence of erroneous signal pulses.

It is necessary, however, to retain intact the longer pulses representing the occurrence of the black and white areas of the printed character so that identification will not be impaired.

Thus, not only must every pulse of less than a predetermined duration be eliminated but the pulse signals that are passed must retain their respective original durations.

When scanning a printed character photoelectrically as with a flying spot of light, the time duration of a pulse signal generated when a portion of the character is sensed will be proportional to the dimension of the portion of the character sensed, and to the velocity of the scanning spot during the sensing of the portion. Thus, an undesired black or white spot positioned on a sheet of paper in close promixity to a printed character will result in the generation of relatively long undesired pulse signals if scanned slowly, and in the generation of relatively short undesired pulse signals if scanned rapidly. In a similar manner, a desired black and white portion of a printed character will result in the generation of a relatively long desired pulse signal if scanned slowly, and in the generation of a relatively short pulse signal if scanned rapidly.

During the scanning of printed characters supported by a document, the speed of the scan cycle may change. In some instances this change may be desired, in other instances it may be undesired.

In either event, a variation in the speed of the scan cycle will result in variations in the duration of the generated pulse signals.

It is presently the practice in the art to utilize a pulse filter to block all pulse signals having time durations equal to or less than a predetermined value. However if the speed of the scan cycle is changed so that the character is scanned more slowly, then the duration of the noise signals, that is, those representing undesired black or white spots, will be increased and they will pass through the pulse filter to generate spurious results. In the other instance, where the character is scanned more rapidly, the duration of some of the desired information signals that represent portions of the character will be decreased to a value less than the value of the largest pulse signal blocked by the filter so that some of the desired pulses will be blocked by the pulse filter to again result in the generation of spurious results.

Thus, it readily becomes obvious that not only must the pulse filter inhibit the passage of all pulse signals having durations equal to or less than a predetermined duration, where the pulse signals represent the sensing of undesired black and white spots at a particular scan speed, but the pulse filter must be responsive to variations in the speed of the scan cycle to prevent the passing of lengthened undesired pulse signals generated by a slowing of the scan cycle, and to prevent the blocking of shortened desired pulse signals generated by a quickening of the scan cycle.

It is a primary object of this invention to provide an improved pulse filter for discriminating pulses with particular time duration characteristics from a train of pulse signals of diverse time duration characteristics, the pulse filter being instantaneously responsive to variations in a simultaneously occurring reference signal to change accordingly the pulse filter time discrimination basis.

It is another object of this invention to provide an improved pulse filter that can subdivide a signal into a number of parts where the duration of each part is related to the change in magnitude of a reference signal.

It is still another object of this invention to provide an improved pulse filter that generates pulse signals having controllable durations.

Other objects and many of the attendant advantages of this invention will be readily appreciated as the apparatus becomes better understood by reference to the following detailed description when considered in connection with the accompanying drawings wherein:

Briefly, a character printed on a document or other record medium having a contrasting background area is scanned by a spot of light that moves rapidly and repeatedly over the character from bottom to top as it is stepped across the document from left to right. The light reflected by the document is picked up by a photoelectric cell sensing unit which generates a two value pulse signal. The first value signal or black scan signal represents the sensing of a portion of a character or a dark area, and the second value signal or white scan signal represents the sensing of a portion of the contrasting background or light area. For convenience it shall be assumed that the positive potential pulse signal represents the sensing of a dark area and therefore a portion of a printed character, and that a negative potential pulse signal represents the sensing of a light area or the background.

The rate of speed of the scan cycle is represented by a reference signal which displays a magnitude that is proportional to the scan rate of speed. For each black scan signal and white scan signal there is a corresponding change in magnitude of the reference voltage.

If the character is scanned at a constant rate of speed, the reference signal will have a constant rate of change, and a time duration of $\Delta T_1$ may be determined which is larger than the duration of the majority of "pepper" pulses resulting from the scan of dark flecks on a white background area. In a similar manner a time duration $\Delta T_2$ may be determined which is larger than the duration of a majority of the "salt" pulses resulting from the scanning of white spots in a black area. $\Delta T_1$ and $\Delta T_2$ may or may not be equal but must be shorter than the duration of the shortest significant pulse generated that indicates the presence of a portion of a character or its background area. If a character is scanned at a constant rate the time durations $\Delta T_1$ and $\Delta T_2$ can be utilized directly to pass or block pulse signals. However, when a variable scanning rate is utilized then the time duration of the pulse signals that represents the sensing of the black and white areas must be compared with the reference signal. In this invention, if during the receipt of a particular pulse signal the continuously changing reference signal experiences a predetermined potential differential equal to $\Delta E_1$, then the structure is conditioned to pass the remainder of the pulse signal. However, if the potential differential is less than the value $\Delta E_1$, then the structure is not conditioned and the pulse signal is not passed.

If during the sensing of the character the speed of the scan cycle is changed (increased or decreased) then the slope of the reference signal and the duration of the pulse signal will change accordingly. However, the relationship of the signals relative to each other will remain the same, and the same results will be produced. Thus, this invention utilizes potential amplitude changes of a reference signal to index and pass black and white scan signals which have a duration longer than a predetermined value and to suppress all other pulse signals. It should be noted that the duration of any particular black or white scan signal is dependent upon the length of the area scanned and the speed of the scan cycle. However, since the rate of change of the reference signal is proportional to the speed of the scan cycle then the potential change experienced by the reference signal during the occurrence of any particular black or white scan signal will always be the same regardless of the speed of the scan cycle.

Referring to the figures, the symbol or character that is to be identified consists, in its usual form, of a black configuration on a white background. This symbol is sensed by a flying spot scanner and converted into a pattern of black and white scan signals. For purposes of illustration only and to facilitate the explanation of the operation of this invention it shall be assumed that a flying spot scanning device is utilized. However, it should be understood that other scanning devices can be utilized successfully and that this invention is not restricted to the utilization of a flying spot scanner.

Figure 1:
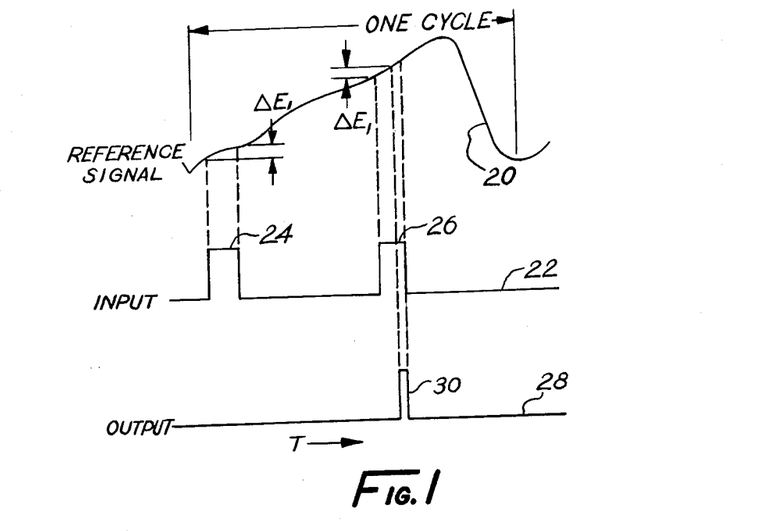
FIG. 1 is a graphic illustration used to explain the principle of operation of this invention.

With reference to FIG. 1, there is illustrated a graphic representation of a reference signal 20 and a black scan signal 22. The instantaneous voltage of the reference signal 20 is proportional to the displacement of the scanning spot relative to time; and the positive going pulse signals 24 and 26 of the video signal 22 indicates the sensing of two dark areas on a contrasting background. In this illustration the pulse 24 is a noise signal and is not desired, and the pulse 26 is an information signal and is desired. The third waveform 28 illustrates the position and duration of a pulse signal 30 that indicates the presence and duration of the desired signal 26 only.

In this illustration, the wider signal 24 which represents an undesired narrow area is blocked while the narrower signal 26 which represents a desired wider area is passed. In this instance the width of the two pulses are reversed because of variations in the scan speed; the pulse 24 represents a narrow area scanned at a very slow rate while the pulse 26 represents a wider area scanned at a faster rate.

In this invention the referenec base utilized is the amplitude differential experienced by the reference signal 20, not time. In FIG. 1, the reference signal 20 experiences a potential differential that is less than $\Delta E_1$ during the occurrence of pulse 24; and a potential differential that is greater than $\Delta E_1$ during the occurrence of pulse 26. The potential magnitude $\Delta E_1$ is chosen to divide the undesired pulse signals from the desired pulse signals, Therefore, since the reference signal experiences a potential differential that is less than $\Delta E_1$ during the occurrence of pulse signal 24; and a potential differential that is more than $\Delta E_1$ during the occurrence of pulse signal 26, pulse signal 26 is allowed to pass through a filter network while pulse signal 24 is inhibited by the filter network.

Figure 2:
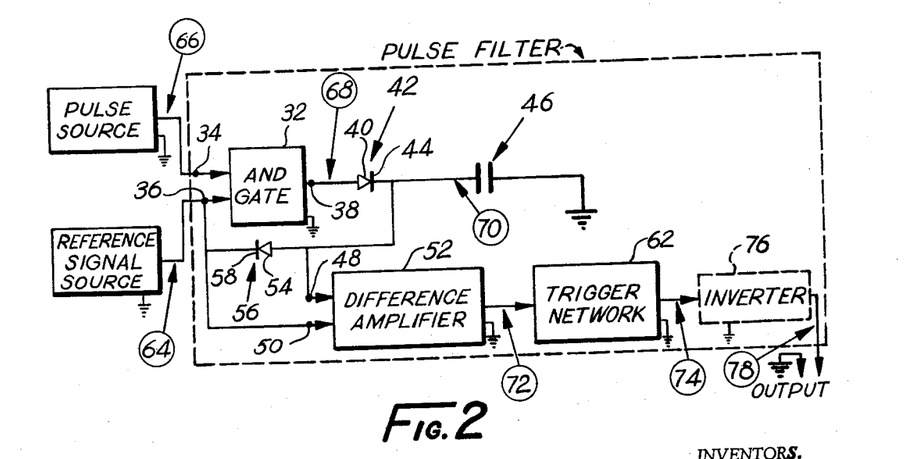
FIG. 2 is a block diagram of structure in accordance with the principles of this invention.
Figure 3:
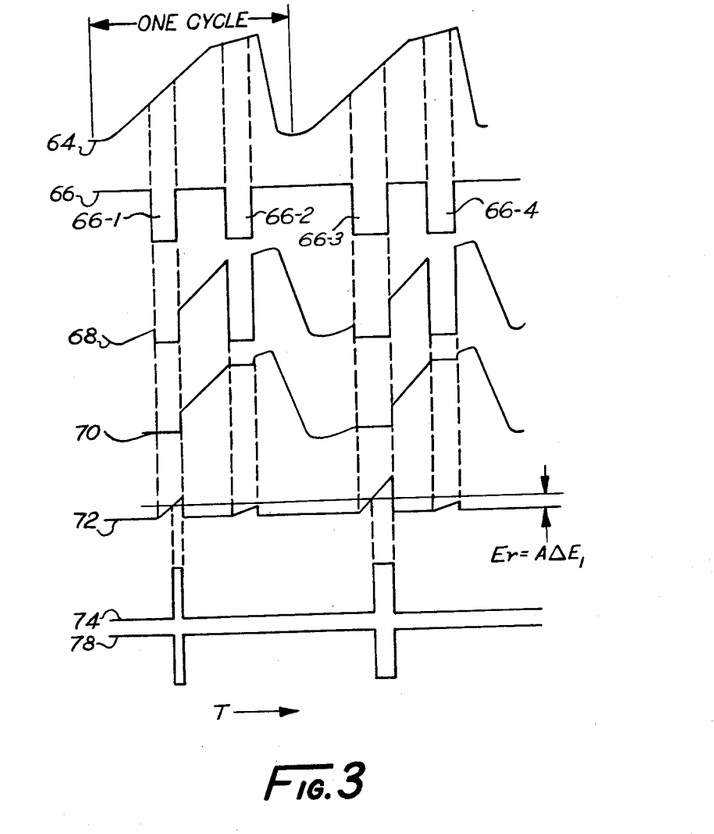
FIG. 3 is a graph of wave forms associated with the structure of FIG. 2.

With reference to FIGS. 2 and 3, there is illustrated a pulse filter or discriminating network and its associated waveforms. An AND gate 32 supports two input terminals 34 and 36, and an output terminal 38. The AND gate 32 functions as a signal selecting means. A crystal diode 42 supports an anode terminal 40 connected to the output terminal 38 of the AND gate, and a cathode terminal 44 connected to one terminal of a storage capacitor 46. The other terminal of the capacitor 46 is connected to a ground terminal. The cathode terminal of the diode 42 is also connected to the anode terminal 54 of a crystal diode 56, and to an input terminal 48 of a D.-C. difference amplifier 52. A second input terminal 50 of the D.-C. difference amplifier 52 is connected to the cathode terminal 58 of the diode 56, and to the input terminal 36 of the AND gate 32. The output terminal of the D.-C. difference amplifier 52 is connected to the input terminal of a pulse generator or trigger network such as a Schmitt trigger 62 or the like sensitive to a potenial amplitude.

In operation the two input terminals of the AND gate 32 are connected to receive the output signals from a sensing device. One signal is the reference signal, and the other signal is the black and/or white scan signal. The reference signal 64 from the reference signal source indicates the rate of scan relative to time and is fed to the input terminal 36 of AND gate 32; and the scan signal 66 from the scan or pulse source indicates the presence of a dark area (a portion of a character) or a light area (a portion of the contrasting background) and is fed to the other input terminal 34.

In this explanation it shall be assumed that positive going scan or pulse signals represent the sensing of dark areas, and that negative going scan or pulse signals represent the sensing of light areas. It shall also be assumed that it is desired to eliminate all negative going pulse signals that represent "salt" or white spots or flecks within a dark area, and pass all significant signals that represent the sensing of the contrasting background area around the desired dark symbol or character.

With reference to FIG. 3, the reference waveform 64 does not have a constant slope, thus indicating that there has been a variation in the speed of the scan cycle during the sensing of the character. The negative going pulse signals 66-1, 66-2, 66-3 and 66-4 of the scan signal 66 represent the sensing of light areas. It must be determined whether or not these negative going pulse signals represent white flecks in a dark area (salt), or whether they actually represent the presence of a desired background area adjacent to a dark area.

From FIG. 3 it can be seen that the reference signal 64 is always positive. Therefore, when a positive pulse signal is fed to the input terminal 34 of the AND gate 32 (FIG. 2), a positive pulse signal will appear at the output terminal 38. However, if a negative potential pulse signal is fed to the input terminal 34, then a positive pulse signal will not appear at the output terminal 38.

Initially, when a positive going pulse of the video signal 66 is fed to the terminal 34, a positive potential signal is fed from the AND gate 32 through the crystal diode 42 to the storage capacitor 46. As long as a positive pulse signal is present at the terminal 34, the waveform 70 on the storage capacitor 46 will follow the reference signal 64. However, at the instant a negative going pulse signal 66-1, 66-2, 66-3 or 66-4 appears, the gate 32 closes, the reference signal 64 is blocked, and the diode 42 is cut off. The signal that appears at the output terminal 38 of the AND gate 32 is represented by waveform 68. The potential on the storage capacitor 46 remains at a constant level during the occurrence of the negative going pulse signals 66-1, 66-2, 66-3 and 66-4 when the AND gate 32 is closed and diode 42 is cut off. The signal on the capacitor 46, and the reference signal 64 are compared with each other in the difference amplifier 52, and a difference output signal 72 is generated. At the instant that the output signal 72 exceeds a predetermined magnitude A $\Delta E_1$ where "A" is the gain of the difference amplifier and $\Delta E_1$ is the critical potential illustrated in FIG. 1; the Schmitt trigger 62 is triggered and an output pulse signal is generated. The diode 56 facilitates recycling. Diode 56 allows the capacitor 46 to discharge when the reference signal drops in potential. Thus, the potential on the capacitor 46 follows accurately the reference signal 64 at all times except during the occurrence of negative going video pulse signals.

With specific reference to FIG. 3, it can be observed that the negative going pulses 66-1 and 66-3 represent the sensing of the background area around a part of a symbol, and that the negative going pulses 66-2 and 66-4, while appearing to have substantially the same duration of the other pulses actually represent the sensing of undesired flecks or "salt." It should also be noticed that the duration of the pulse signal 74 that appears at the output terminal of the Schmitt trigger 62 is equal to the duration of the originally received negative going pulse signal minus a small amount removed from its leading edge.

An inverter 76 fed by the Schmitt trigger 62 inverts the waveform 74 to present a signal 78 that does not contain pulse signals that represent the sensing of undesired flecks or "salt."

To remove pulses that represent the sensing of undesired dark areas in the contrasting light background, or "pepper," the inverter 76 is removed from the output terminal of the Schmitt trigger 62, and is connected to the input terminal 34 of the AND gate 32. The scan signal is then first fed through the inverter where it is inverted, and then to the input terminal 34. The output signal that now appears at the output terminal of the Schmitt trigger 62 represents a signal that is free of pulses that represent the sensing of undesired black spots on a light background or "pepper."

By coupling a network with an inverter connected to the output terminal in cascade with another network with an inverter connected to the input terminal, a signal that is free of "salt" and "pepper" pulses can be obtained.

A salt circuit removes a portion of the leading edge of white scan signals while a pepper circuit removes a portion of the leading edge of black scan signals. When a salt circuit and a pepper circuit, each sensitive to the same potential $\Delta E_1$ are coupled together in cascade, all white and black scan signals that represent a potential less than $\Delta E_1$ will be blocked and all other scan signals will be passed without change in length. This condition occurs because the potential $\Delta E_1$ that was removed from the leading edge of the black scan signal is added to the trailing edge of the black scan signal because the potential $\Delta E_1$ was removed from the leading edge of the white scan signals.

However, if a salt circuit has a critical potential setting of $\Delta E_1$ and is coupled in cascade with a pepper circuit that has a critical potential setting of $\Delta E_2$, then all white scan signals represented by a potential smaller than $\Delta E_1$ and all black scan signals represented by a potential smaller than $\Delta E_2$ will be blocked. However, all black scan signals passed will be lengthened by an amount $\Delta E_1 - \Delta E_2$. The pulse signals passed can be restored to their original widths by connecting a third circuit in cascade with the salt and pepper circuits to remove a potential $\Delta E_1 - \Delta E_2$.

The filtering characteristics of this circuit can be altered by varying the sensing or triggering level $E_r$ (waveform 72) of the Schmitt trigger.

Figure 4:
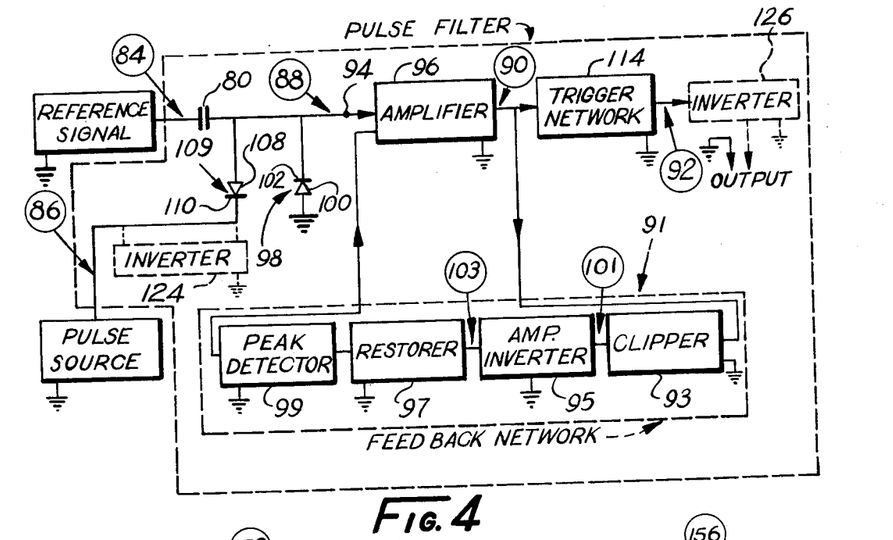
FIG. 4 is a block diagram of another embodiment of structure in accordance with the principles of this invention.
Figure 5:
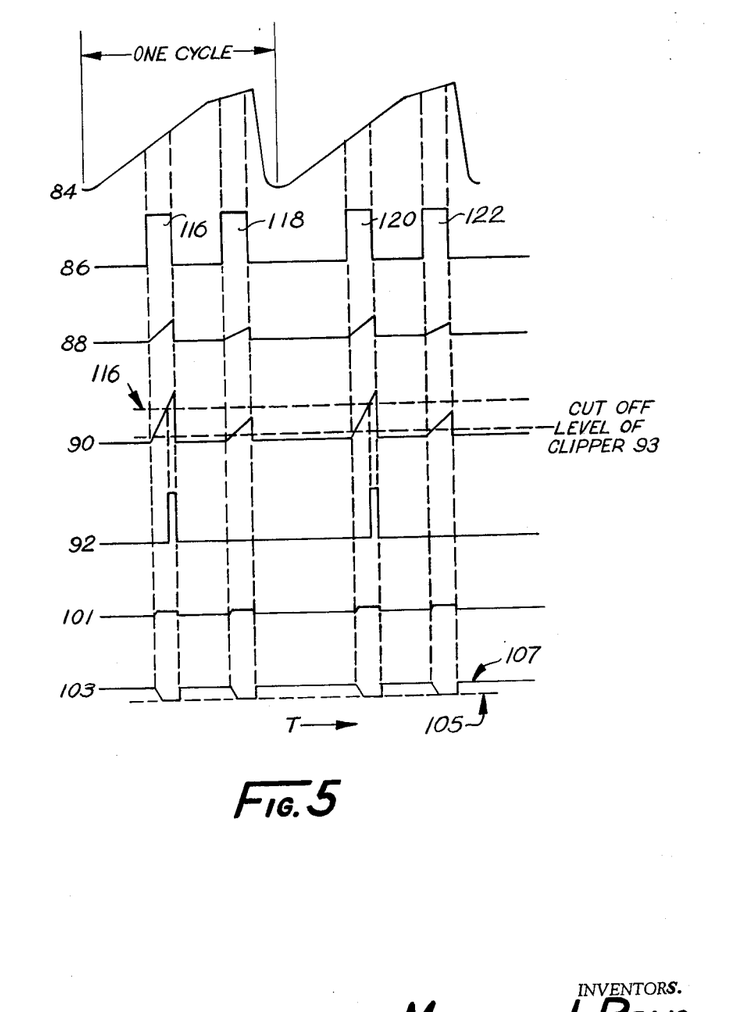
FIG. 5 is a graph of wave forms associated with the structure of FIG. 4.

With reference to FIGS. 4 and 5, there is illustrated in block diagram form another embodiment of this invention and its corresponding waveforms. A capacitor 80 supports a first and a second terminal. The first terminal is connected to receive the reference signal 84 which represents the displacement of the scan spot relative to time. The second terminal is connected to an input terminal 94 of a D.-C. amplifier 96. A crystal diode 98 supports an anode terminal 100 connected to a ground terminal, and a cathode terminal 102 connected to the input terminal 94 of the D.-C. amplifier 96. Another crystal diode 109 supports an anode terminal 108 connected to the input terminal 94 of the D.-C. amplifier 96, and a cathode terminal 110 that is connected to receive the pulse signals 86 from the scan or pulse source. The output terminal of the D.-C. amplifier 96 is connected to the input terminal of a trigger network such as a Schmitt trigger 114 or the like sensitive to potential amplitudes.

The video pulse signal 86 contains a number of positive going pulse signals 116, 118, 120, and 122 which, because of the assumptions stated previously, represent the sensing of dark areas. The signal 86 is fed to the cathode 110 of the diode 109. The reference signal 84 is fed to the capacitor 80. The capacitor 80 together with the diode 109 functions as a signal selecting means.

When a black signal or pulse 116, 118, 120, or 122 of waveform 86 is fed to the cathode 110 of crystal diode 109, the diodes 98 and 109 cut off and the reference signal 84 is fed directly to the input terminal 94 of the D.-C. amplifier 96. When a white signal or pulse of waveform 86 is fed to the cathode 110, the diodes 98 and 109 conduct and clamp the input terminal 94 to ground potential. Therefore, when a black signal is fed to the cathode 110, the signal that is fed to the input terminal 94 is the instantaneous value of the waveform 84 present during the occurrence of a black signal minus the magnitude of the reference signal 84 at the beginning of the black signal.

At the end of each cycle the reference signal is returned to its most negative value and capacitor 80 is discharged to its initial condition by the crystal diode 109.

In this manner the exact potential differential experienced by the reference signal during the occurrence of a pulse of the video signal is transmitted through the capacitor 80 to the input terminal 94 of the D.-C. amplifier 96.

The input signal to the D.-C. amplifier 96 is illustrated by waveform 88; and the output signal from the D.-C. amplifier 96 is illustrated by the waveform 90.

The Schmitt trigger is adjusted for activation by a pulse signal having a magnitude equal to or above a predetermined value. With reference to waveform 90, the signal that appears at the output terminal of the D.-C. amplifier 96 is fed to the input terminal of the Schmitt trigger 114. The dotted line 116 indicates the magnitude of potential that must be reached to trigger the Schmitt trigger 114.

A feedback network 91 is connected across the D.-C. amplifier 96 to prevent variations or shifts of the base level of the output signal 90 from the D.-C. amplifier 96. The potential level required to trigger the Schmitt trigger remains constant. Therefore, if the base level of the signal 90 becomes more positive, then the undesired pulse signals that represent the sensing of salt or pepper are moved upward and may trigger the Schmitt trigger to generate spurious results. In the other case, if the base level of the signal 90 becomes more negative, than the desired pulse signals that represent the sensing of a portion of a character or its contrasting background are moved downward and may not be large enough to trigger the Schmitt trigger to again generate the desired pulse signals.

The feedback network 91 comprises the combination of a clipper 93, an amplifier inverter 95, a D.-C. restorer 97, and a peak detector 99 connected in cascade. The input terminal of the clipper 93 is connected to receive the output signal 90 from the D.-C. amplifier; and the output terminal of the peak detector 99 is connected to an input terminal of the D.-C. amplifier 96.

In operation, the feedback network 91 feeds a restoring D.-C. potential to the input of the D.-C. amplifier to maintain or clamp the base level of the output signal 90 of the D.-C. amplifier to a constant value.

With reference to FIG. 5, in operation the clipper cuts off the top portion of each pulse in the signal 90 at a desired level to provide the signal 101. This signal is then amplified and inverted in a D.-C. amplifier to provide the signal 103. The D.-C. restorer restores the D.-C. base line to the potential level of 105. The peak detector generates a positive potential proportional to the magnitude 107 defined by the distance between the clamped level 105 and the most positive portion of the signal 103 to provide a compensating D.-C. potential. The D.-C. output from the peak detector 99 varies with variations in the base level of the output signal 90 and is fed to the input terminal of the D.-C. amplifier 96 to prevent shifting of the base level of the signal 90.

In this illustration, in waveform 86 the pulses 116 and 120 represent the sensing of desired black areas or portions of a character, and the pulses 118 and 122 represent the sensing of undesired black specks or "pepper."

The output signal 92 from the Schmitt trigger 114 includes only those pulse signals that represent desired information; and each pulse signal present has a duration less than the duration of the original corresponding pulse.

Experience has shown that the embodiment disclosed in FIG. 4 may be desirable over that disclosed in FIG. 2 as the structure of FIG. 2 has a common mode signal that is utilized to determine the potential differential experienced by the reference signal while the structure of FIG. 4 does not have a common mode signal. With reference to FIG. 3, the common mode signal referred to is contained in waveforms 64 and 70. These signals are fed to the difference amplifier 52. The major objection to the presence of a common mode signal is that the amplifier may have different operating parameters for different pulse positions. This condition is usually caused by circuit non-linearity.

In the utilization of the embodiment disclosed in FIG. 4, to remove pulses that represent the sensing of undesired white flecks on a dark background, or "salt," the video pulse signal must first pass through an inverter 124 prior to reaching the crystal diode 109; and another inverter 126 must be coupled to the output terminal of the Schmitt trigger 114 to present output signals of the correct polarity.

By coupling a pulse filter having a first inverter at its input terminal and a second inverter at its output terminal in cascade with another network that does not have any inverters at its input or output terminals, a signal that is free of salt and pepper pulses is obtained.

Figure 6:
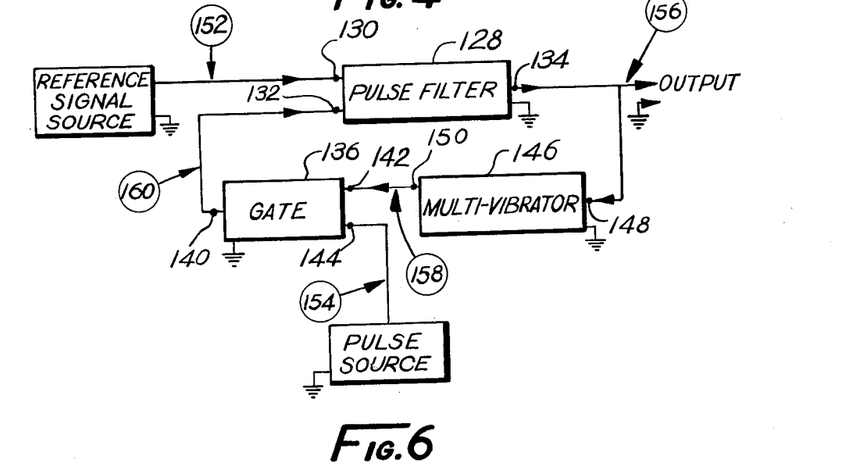
FIG. 6 is a block diagram of a variable frequency pulse generator.

With reference to FIG. 6, there is disclosed a block diagram of a potential controllable pulse generating network. A pulse generator of this type, to be described, is useful in character recognition systems and the like where clock pulse signals are required to divide the scan displacement into equal increments regardless of the instantaneous velocity of the scanning spot.

Figure 7:
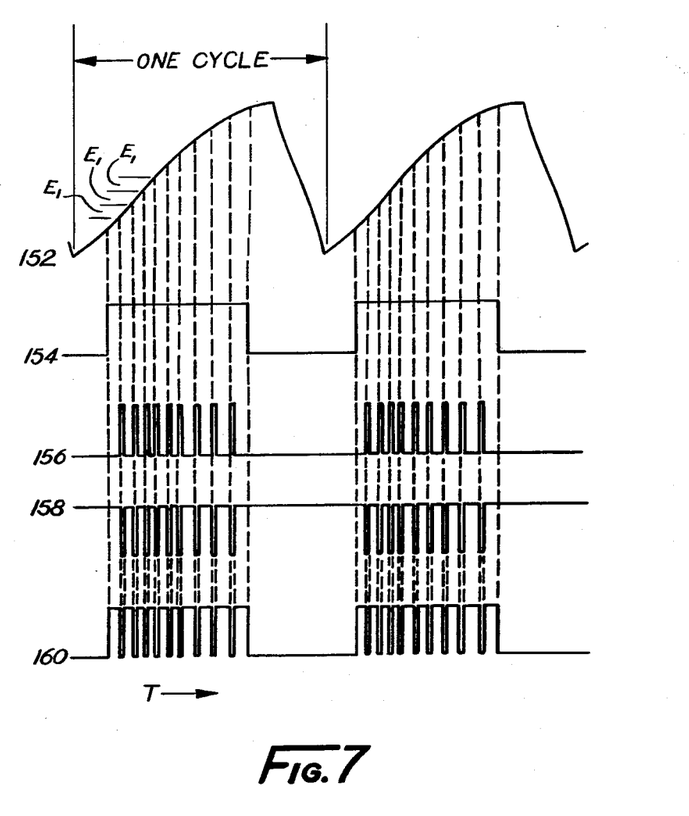
FIG. 7 is a graph of the timing cycle for the structure of FIG. 6.

FIG. 7 illustrates the waveforms associated with this network. A pulse filter 128 of the type disclosed in FIGS. 2 or 4 supports two input terminals 130 and 132, and an output terminal 134. An AND gate 136 supports an output terminal 140 and two input terminals 142 and 144. The output terminal 140 of the AND gate 136 is connected to the input terminal 132 of the pulse filter 128. A pulse generator network such as a monostable multivibrator 146 or the like supports an input terminal 148 connected to the output terminal 134 of the pulse filter 128, and an output terminal 150 connected to the input terminal 142 of the AND gate 136.

The reference signal 152 represents the scan displacement relative to time. This signal is fed to the input terminal 130 of the pulse filter 128. A control pulse signal 154 from a scan or pulse signal source is fed to the input terminal 144 of the AND gate 136. The generated output pulse signals 156 appear at the output terminal 134 of the pulse filter 128. The pulse signals 158 appear at the output terminal 150 of the monostable multivibrator 146; and the pulse signals 160 appear at the output terminal 140 of the AND gate 136.

In operation, initially the output signal from the monostable multivibrator is most positive to condition the AND gate 136 to pass a positive pulse control signal 154. The leading edge of the first appearing control pulse signal is passed through the AND gate 136 to the terminal 132 of the pulse filter 128. After a time interval determined by the slope of the reference signal 152 (that time required for the reference signal to experience a potential differential of $E_1$ volts) a positive going pulse signal appears at the output terminal 134 of the pulse filter. This signal is fed to and triggers the monostable multivibrator 146 whose output signal 158 is fed to and closes the AND gate 136 for a very short and definite interval of time. The closing of the AND gate stops the passage of the control signal 154. The time interval that the AND gate is closed need only be long enough to allow the filter to be restored and ready for the next appearing pulse. Thus, shortly after a positive going pulse signal appears at the terminal 134, the AND gate 136 is closed, and the signal on the terminal 134 goes negative. After a short interval of time the signal 158 becomes positive and opens the AND gate 136 to allow a positive going control signal 154 to be fed to the pulse filter 128. After a short interval of time determined by the slope of the reference signal 152, a second positive going pulse signal appears at the output terminal 134 of the pulse filter.

The network continues to generate pulse signals at the output terminal 134 of the pulse filter 138. Termination can be conveniently accomplished upon the generation of the $n$th pulse or $n\Delta E$ volts change by terminating the positive portion of waveform 154.

Thus, a definite relationship exists between the spacing of the output pulse signals that appear at the output terminal 134, and the waveform of the reference signal. In this invention, immediately after a starting point determined by the leading edge of the control signal 154, a pulse is generated each instant that the reference signal experiences a predetermined potential differential. This continues until the control signal terminates.

In FIG. 6, if the structure disclosed in FIG. 2 is utilized for the pulse filter 128, then an inverter must be positioned between the output terminal 38 of the AND gate 32, and the anode terminal 40 of the crystal diode 42 of FIG. 2.

Obviously many modifications and variations of the present invention are possible in the light of the above teachings. It is therefore to be understood that within the scope of the appended claims the invention may be practiced otherwise than as specifically described.

What is claimed is:

1. In a device, a varying potential reference signal source, a pulse signal source, a pulse filter comprising signal selecting means coupled to pass reference signal present during the occurrence of an activating pulse signal, a D.-C. amplifier fed by said signal selecting means, a clipper network fed by said D.-C. amplifier, an amplifier inverter fed by said clipper network, a D.-C. restorer fed by said amplifier inverter, a peak detector interposed between said D.-C. restorer and the D.-C. amplifier, and amplitude sensitive means activated by a signal from said D.-C. amplifier having an amplitude greater than a given value to generate a pulse signal having a duration shorter than the duration of the activating pulse signal.

2. A controllable frequency signal generator comprising a pulse generator network, gate means fed by said pulse generator network and a pulse signal source, signal selecting means coupled to a varying potential reference signal source to pass reference signals present during the occurrence of an activating pulse signal from said gate means, and a trigger network interposed between said signal selecting means and said pulse generator network and activated by a signal having an amplitude greater than a given value.

3. A controllable frequency signal generator comprising a pulse generator network, gate means fed by said pulse generator network and a pulse signal source, signal selecting means coupled to a varying potential reference signal source to pass reference signals present during the occurrence of a pulse signal from said gate means, amplifier means fed by said signal selecting means, and amplitude sensitive means interposed between said amplifier means and said pulse generator network and activated by a signal having an amplitude greater than a given value to generate pulse signals.

4. A controllable frequency signal generator comprising a pulse generator network, gate means fed by said pulse generator network and a pulse signal source, signal selecting means coupled to a varying potential reference signal source to pass a reference signal present during the occurrence of a pulse signal from said gate means, amplifier means fed by said signal selecting means, a feedback network coupled to said amplifier means, and amplitude sensitive means interposed between said amplifier means and said pulse generator network and activated by a signal that has an amplitude greater than a given value to generate pulse signals.

5. A controllable frequency signal generator comprising a pulse generator network, gate means fed by said pulse generator network and a pulse signal source, a capacitor coupled to a varying potential reference signal source, a diode interposed between said capacitor and said pulse signal source to pass a reference signal through said capacitor during the occurrence of a pulse signal, and amplitude sensitive means coupled to said capacitor and said pulse generator network and activated by a reference signal passed through said capacitor and has an amplitude greater than a given value to generate pulse signals.

6. A controllable frequency signal generator comprising a pulse generator network, first gate means fed by said pulse generator network and a pulse signal source, a second gate means coupled to a varying potential reference signal source to pass a reference signal present during the occurrence of a pulse signal from said first gate means, a difference amplifier fed by said second gate means and said reference signal source, and amplitude sensitive means fed by said difference amplifier and activated by a signal that has an amplitude greater than a given value to generate pulse signals.

7. In a character recognition device in which information on a record medium is sensed by a scanning device at a rate of speed which may vary, the scanning device generating signal pulses representative of the information being scanned and reference signals representative of the rate of scanning said record medium, means for applying said reference signals coincidentally with said signal pulses to circuit means, said circuit means including means for producing further signals representative of the changes in amplitude of said reference signals per unit of time during the duration of each of said coincident signal pulses, and means for applying said further produced signals to a utilization circuit for controlling same in accordance with said further produced signals.

8. In a character recognition device in which information on a record medium is sensed by a scanning device at a rate of speed which may vary, the scanning device generating signal pulses representative of the information being scanned and reference signals representative of the rate of scanning said record medium, means for applying said reference signals coincidentally with said signal pulses to circuit means, said circuit means including means for producing further signals representative of the changes in amplitude of said reference signal per unit of time during the duration of each of said coincident signal pulses, and pulse generating means controlled by said further produced signals for generating a pulse for each one of said further produced signals which attains a predetermined minimum amplitude.

9. The device as defined in claim 8 wherein said further produced signals comprise a single signal of variable amplitude for each of said signal pulses so that said pulse generating means generates a pulse for each of said further produced signals having the predetermined minimum amplitude but no pulse for each of said further signals not having the predetermined minimum amplitude, whereby the presence or absence of pulses from said pulse generating means bears a relation to said reference signals.

10. The device as defined in claim 8 wherein said further produced signals comprise a single signal of variable amplitude and wherein said pulse generating means generates a pulse coextensive in duration with the duration of the part of said further produced signal which has attained the predetermined minimum amplitude, whereby the pulses generated by said pulse generating means have durations bearing a relation to said reference signals.

11. The device as defined in claim 8 wherein said further produced signals comprise a plurality of signals of the same amplitude for each of said signal pulses, whereby said pulse generating means generates a pulse for each of said further produced signals having spacings bearing a relation to said reference signals.

12. In a character recognition device in which information on a record medium is sensed by a scanning device at a rate of speed which may vary, the scanning device generating signal pulses representative of desired and undesired information and reference signals representative of the rate of scanning said record medium, means for applying said reference signals coincidentally with said signal pulses to circuit means, said circuit means including means for producing further signals representative of the changes in amplitude of said reference signal per unit of time during the duration of each of said coincident signal pulses, and pulse generating means controlled by said further produced signals for generating a pulse for each of said further produced signals which attains a predetermined minimum amplitude, whereby pulses are generated for the signal pulses representative of desired information but no pulses are generated for the signal pulses representative of undesired information.

13. In a device, a source of signal pulses, a source of varying reference signals, means for applying said reference signals coincidentally with said signal pulses to circuit means, said circuit means including a gate for passing said reference signals except during the duration of said coinciding signal pulses, a storage capacitor connected to the output of said gate, a difference amplifier connected to receive the output of said storage capacitor and also said reference signal and to subtract the reference signal from the output of said storage capacitor thereby producing signals representative of the changes in amplitude of said reference signal per unit of time during the duration of each of said coincident signal pulses, and means for applying said produced signals to a utilization circuit for controlling same in accordance with said produced signals.

14. In a device, a source of signal pulses, a source of varying reference signals, means for applying said reference signals coincidentally with said signal pulses to circuit means, said circuit means including means for producing further signals representative of the changes in amplitude of said reference signal per unit of time during the duration of each of said coincident signal pulses, said means for producing the further signals comprising a gate for passing said reference signals only during the duration of said coinciding signal pulses, and means for applying said further produced signals to a utilization circuit for controlling same in accordance with said further produced signals.

15. In a device, a source of signal pulses; a source of reference signals; means for applying said reference signals coincidentally with said signal pulses to circuit means; said circuit means including means for producing further signals representative of the changes in amplitude of said reference signal per unit of time during the duration of each of said coincident signal pulses; said means for producing the further signals comprising a circuit for passing said reference signals only during the duration of said coinciding signal pulses, amplifier means for receiving said passed reference signals, and feedback means connected between the output and input of said amplifier means for feeding to the input of said amplifier a restoring potential derived from the output of said amplifier to clamp the amplifier output base level to a constant value; and means for applying said further produced signals to a utilization circuit for controlling same in accordance with said further produced signals.

16. The device as defined in claim 15, wherein said feedback means comprises a clipper fed by said amplifier means, an inverter fed by said clipper, a restorer fed by said inventer, and a peak detector fed by said restorer and feeding a restoring potential to the input of said amplifier means.

17. In a character recognition device in which information on a record medium is sensed by a scanning device at a rate of speed which may vary, the scanning device generating desired information signals representative of the information being scanned and undesired noise signals to be filtered, circuit means for discriminating between said information signals and said noise signals, and means for applying to said discriminating circuit means a reference signal representative of the rate of scanning speed of said scanning device for controlling said discriminating circuit means in accordance with the variable rate of scanning speed of said scanning device

References Cited in the file of this patent

UNITED STATES PATENTS

| | | |
|---|---|---|
| 2,459,462 | Shenk | Jan. 10, 1949 |
| 2,534,264 | Hoeppner | Dec. 19, 1950 |
| 2,579,473 | Chatterjea | Dec. 25, 1951 |
| 2,589,833 | Longmire et al. | Mar. 18, 1952 |
| 2,653,187 | Luck et al. | Sept. 22, 1953 |
| 2,718,449 | Piety et al. | Sept. 20, 1955 |